(12) United States Patent
Sawchuk (10) Patent No.: US 7,131,804 B2
(45) Date of Patent: Nov. 7, 2006

(54) GENERATOR TRAILER WITH ANCHOR SYSTEM

(76) Inventor: Allen Sawchuk, 66 Donald Close, P.O. Box 1334, Red Deer (CA) T4N-7B6

( * ) Notice: Subject to any disclaimer, the term of this patent is extended or adjusted under 35 U.S.C. 154(b) by 0 days.

(21) Appl. No.: 10/904,450

(22) Filed: Nov. 10, 2004

(65) Prior Publication Data

US 2006/0099045 A1    May 11, 2006

(51) Int. Cl.
    *B60P 7/08*    (2006.01)
(52) U.S. Cl. .................. 410/100; 410/81; 410/103; 410/106; 410/116
(58) Field of Classification Search ............ 410/10–12, 410/19–20, 23, 80–81, 96–97, 100, 103, 410/106, 110, 116; 296/167, 35.3; 248/499
    See application file for complete search history.

(56) References Cited

U.S. PATENT DOCUMENTS 2,024,444 A * 12/1935 Friedlaender ................ 410/10

| 6,047,989 | A | 4/2000 | Wood |
| 6,250,529 | B1 | 6/2001 | Babbitt et al. |
| 6,709,208 | B1 * | 3/2004 | Lyrstrand et al. ........... 410/115 |
| 6,939,095 | B1 * | 9/2005 | Hugg ........................ 410/102 |

* cited by examiner

*Primary Examiner*—Stephen Gordon
(74) *Attorney, Agent, or Firm*—John J. Elnitski, Jr.

(57) ABSTRACT

A generator trailer with anchor system adapted for transporting a large generator. The trailer has a bed with a front, rear and two sides surrounding the bed. There are at least four tightening devices. Each of the tightening devices includes a trailer component, an adjustable tension component and a generator component. The trailer component attaches to the trailer. The generator component is adapted to be attached to the generator. The adjustable tension component attaches between the attached trailer component and the attached generator component to provide tension to secure the generator to the trailer and provides a quick disconnect from the generator.

6 Claims, 9 Drawing Sheets

GENERATOR TRAILER WITH ANCHOR SYSTEM

BACKGROUND

The present invention generally relates to trailers. More specifically, the present invention relates to a trailer with an anchor system for securing large generators for transport.

Large generators are used at sites as temporary power. The generators are so large that a trailer is required to transport such a generator to and from a site, where it remains mounted. A trailer is also required to transport such a large generator that is to be installed temporarily at a site, until further decisions are made regarding utility. Typically, the generator is bolted or welded to the trailer to anchor the generator to the trailer, during transport. This increases the time and complexity to secure and remove the generator when using a trailer. When the generator is bolted to the trailer, specific wrenches are needed to secure or loosen the bolts holding the generator to the trailer. The use of bolts requires a person with enough strength to tighten and loosen the bolts, which could lead to strain type injuries to the person performing such a task.

It is an object of the present invention to provide a trailer with an anchor system for a generator which provides an easy process for securing and unsecuring the generator in relation to the trailer.

SUMMARY OF THE INVENTION

A generator trailer with anchor system adapted for transporting a large generator. The trailer has a bed with a front, rear and two sides surrounding the bed. There are at least four tightening devices. Each of the tightening devices includes a trailer component, an adjustable tension component and a generator component. The trailer component attaches to the trailer. The generator component is adapted to be attached to the generator. The adjustable tension component attaches between the attached trailer component and the attached generator component to provide tension to secure the generator to the trailer and provides a quick disconnect from the generator.

DETAILED DESCRIPTION

Figure 1:
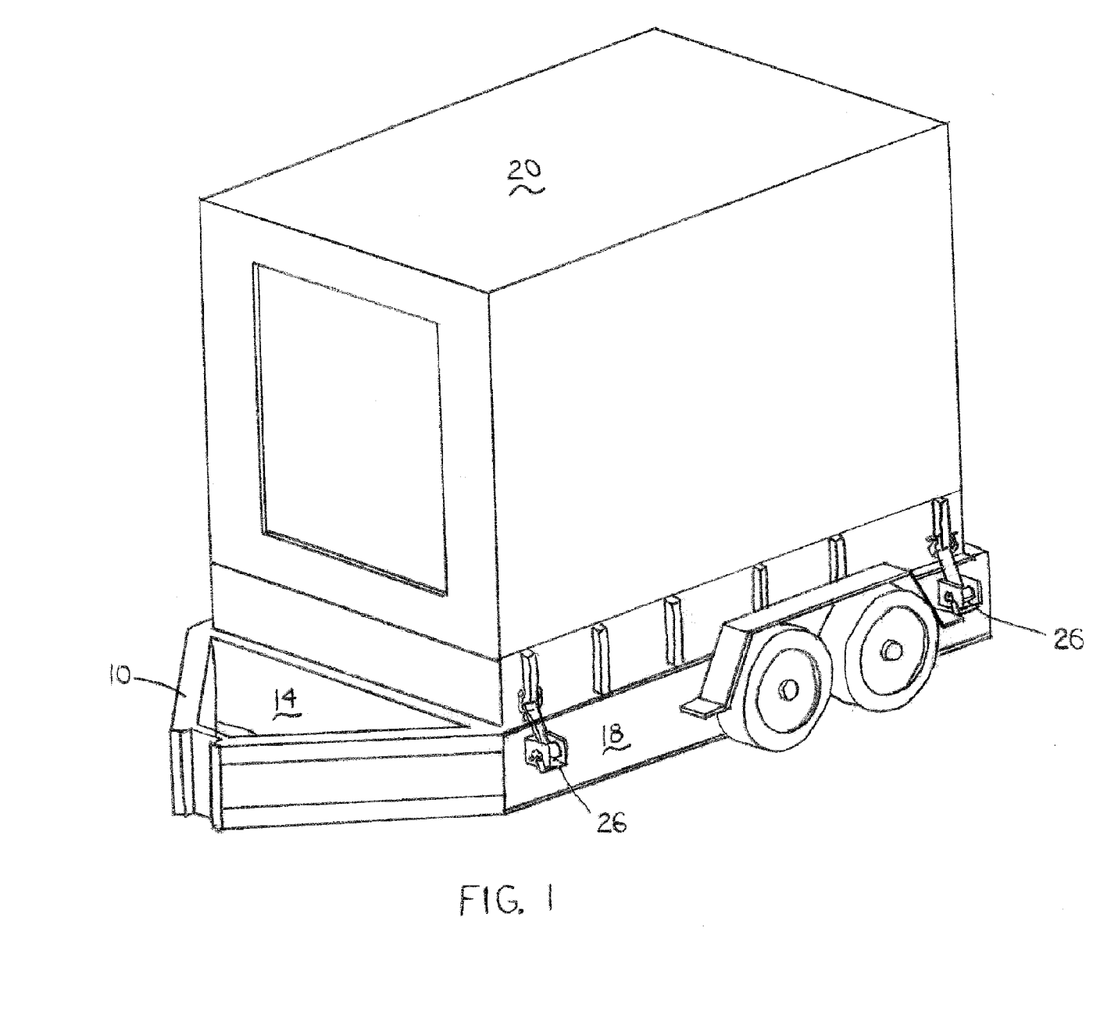
FIG. 1 is a perspective view of a trailer with an anchor system according to the present invention.
Figure 2:
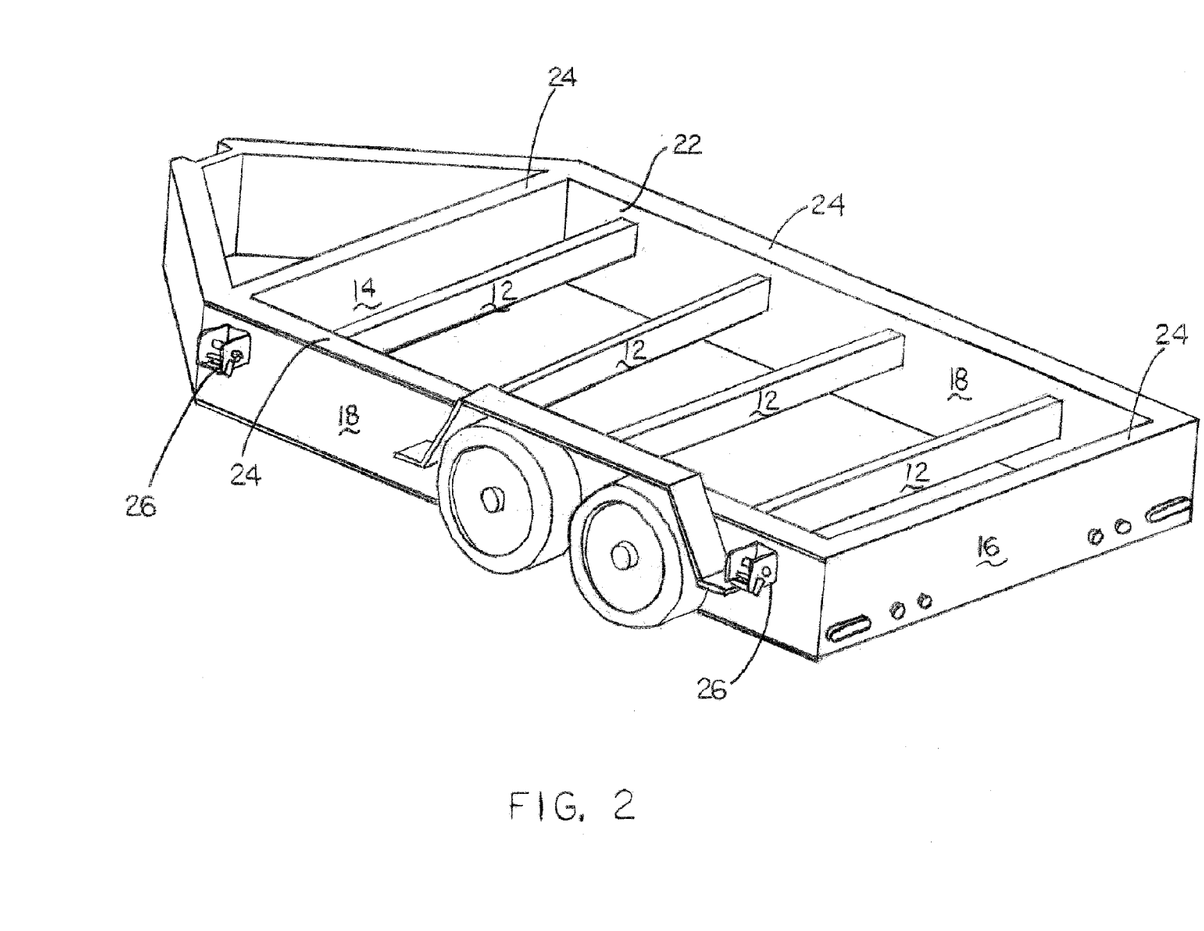
FIG. 2 is a perspective view of a trailer with an anchor system according to the present invention.
Figure 3:
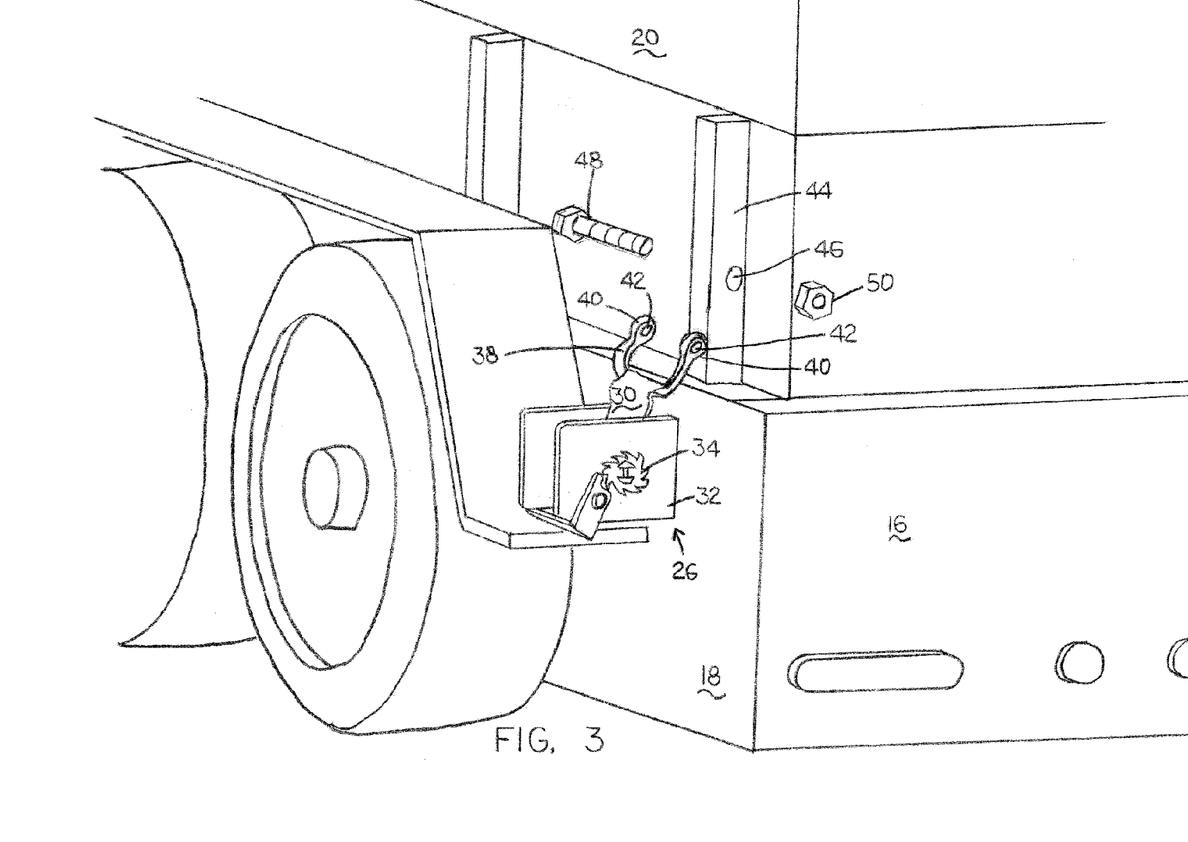
FIG. 3 is a perspective exploded view of a trailer with an anchor system according to the present invention.
Figure 4:
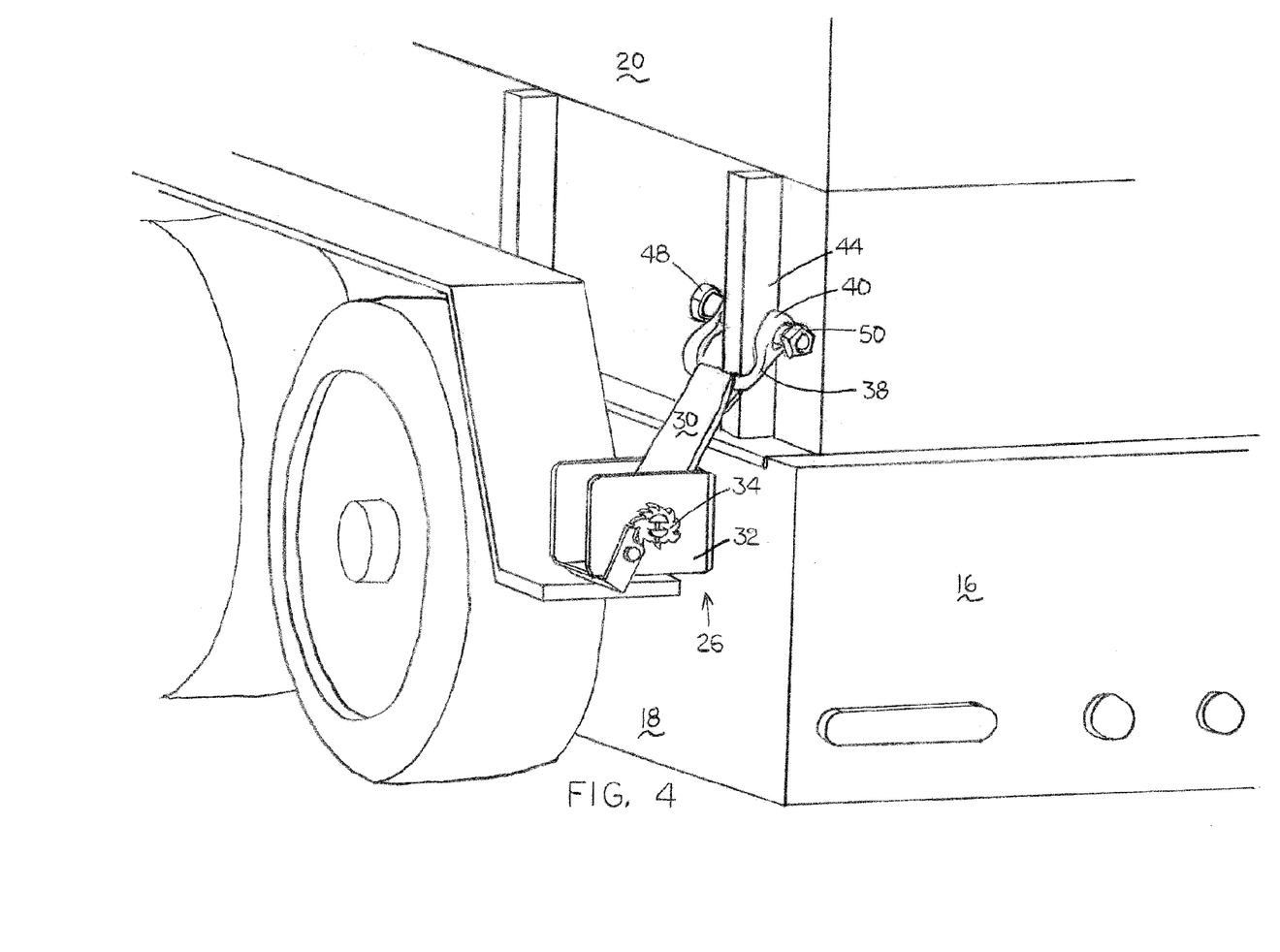
FIG. 4 is a perspective view of a trailer with an anchor system according to the present invention.
Figure 5:
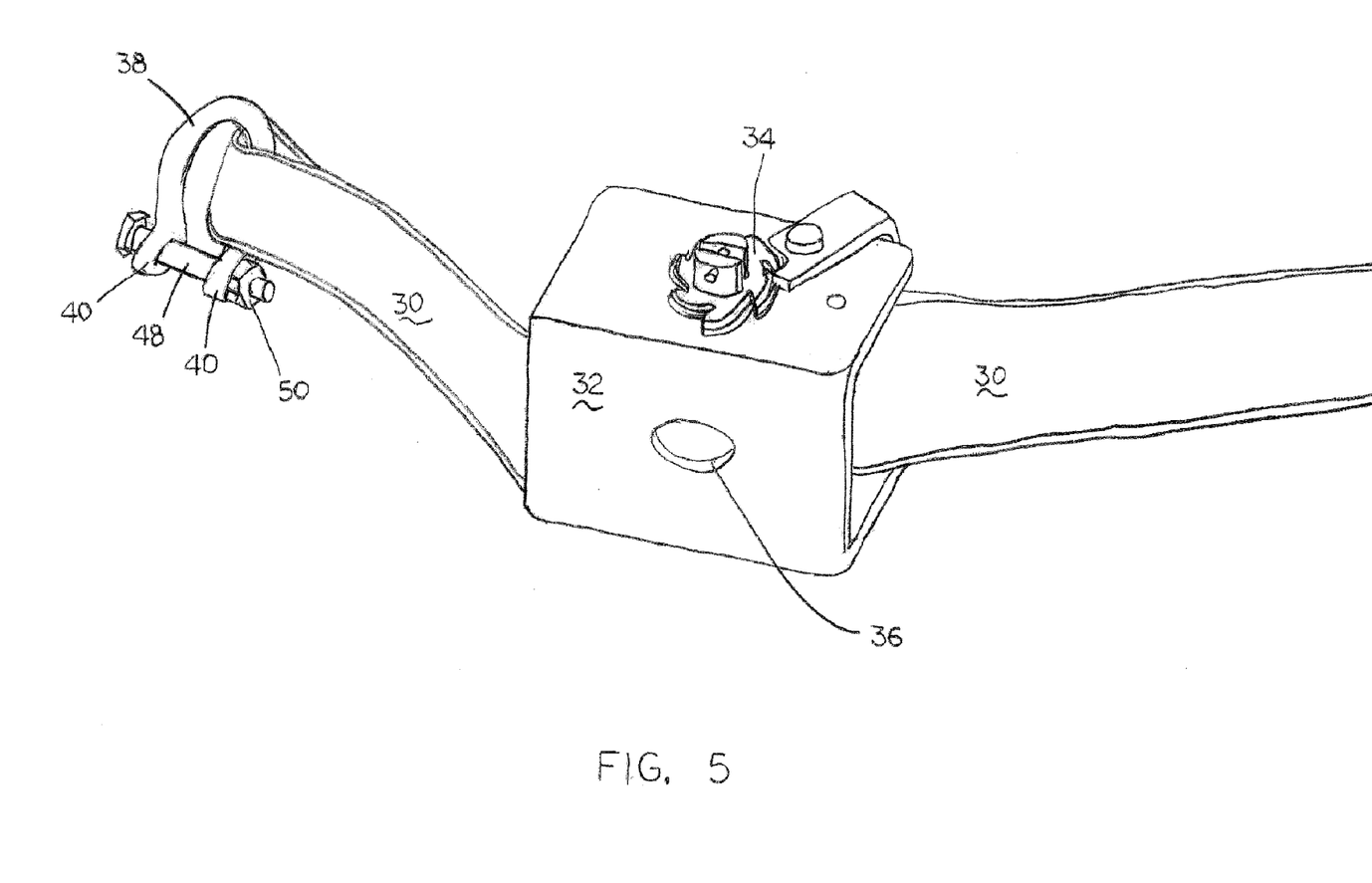
FIG. 5 is a perspective view of a tightening device according to the present invention.

The present invention is a trailer with an anchor system for large generators, as shown in FIGS. 1–9. The anchor system includes at least four tightening devices. FIGS. 1–2 shows the trailer 10 as a trailer 10 with a bed 12 surrounded by a front 14, rear 16 and two sides 18. FIG. 1 shows a generator 20 mounted on the bed 12 of the trailer 10. FIG. 2 shows the trailer 10 without the generator 20. The trailer 10 includes extended walls 22 extending upward from the bed 12 of the trailer 10 at the front 14, rear 16 and sides 18 of the trailer 10. The bed 12 of the trailer 10 within the extended walls 22 is approximately the same size as the base of the generator 20. The trailer 10 could also be without the extended walls 22, such that the bed 12 is even with a top surface 24 of the front 14, rear 16 and sides 18 of the trailer 10 and the generator 20 sits on the top surfaces 24. The tightening devices 26 can be mounted two on each side 18 or one on each of the front 14, rear 16 and sides 18. The tightening devices 26 are designed to have a quick release feature to simplify attachment to the generator 20.

Figure 6:
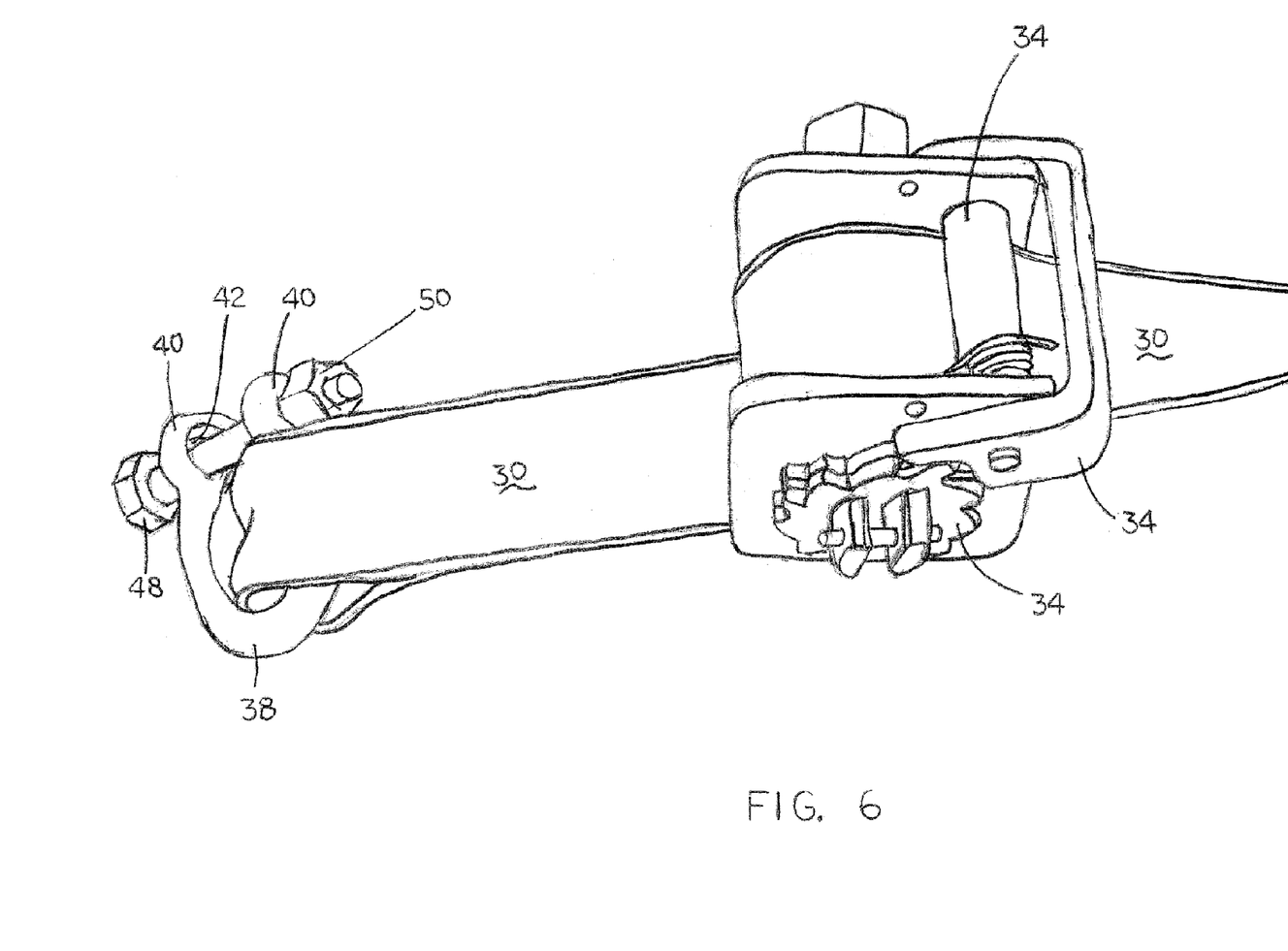
FIG. 6 is a perspective view of a tightening device according to the present invention.
Figure 7:
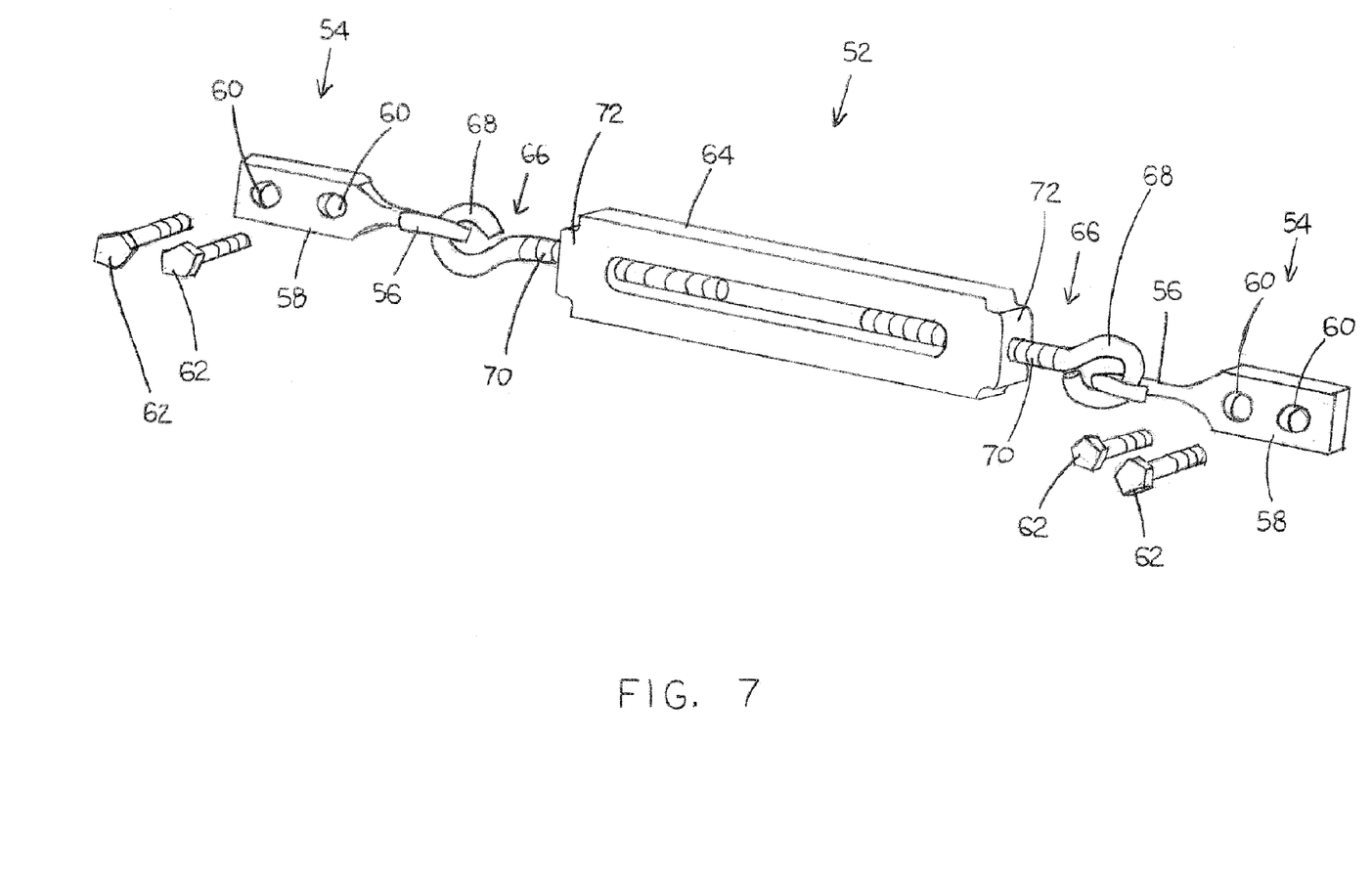
FIG. 7 is a perspective view of a tightening device according to the present invention.
Figure 8:
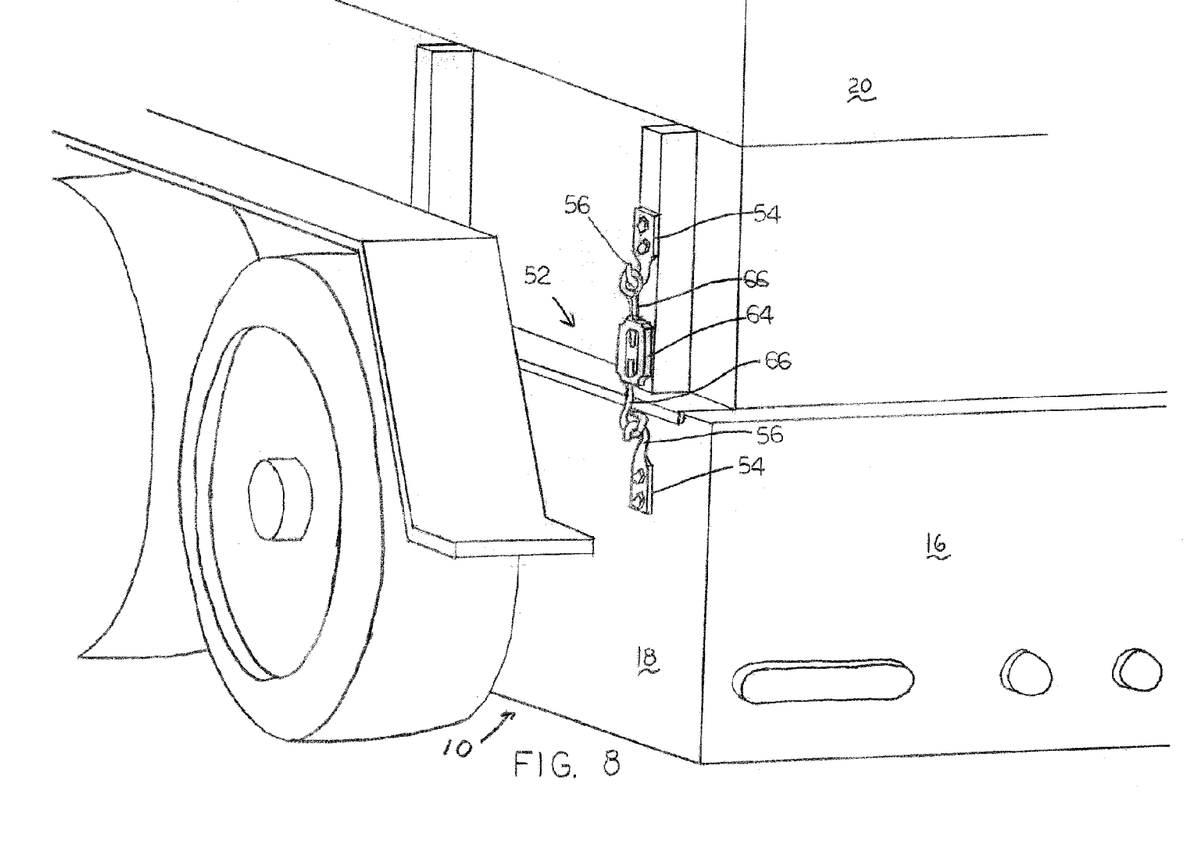
FIG. 8 is a perspective view of a trailer with an anchor system according to the present invention.

Two tightening devices 26 are shown mounted to each side 18 of the trailer 10. FIGS. 1–6 show a first version of the tightening device 26 and FIGS. 7–8 show a second version of the tightening device 26. The first version of the tightening device 26 includes a ratchet body 32 and a ratchet mechanism 34, as shown in FIGS. 3–6. The ratchet body 32 is mounted to the sides 18 of the trailer 10. The ratchet body 32 is shown with a bolt hole 36 for bolting the ratchet body 32 in a permanent manner to the trailer 10. The ratchet body 32 could also be welded or attached by other fastening means to the trailer 10. The ratchet mechanism 34 is shown as one of many of the standard ratchet mechanisms available which receives the ratchet strap 30. One end of the ratchet strap 30 attaches to the ratchet mechanism 34, while the other end of the ratchet strap 30 includes attachment of a clevis 38. The clevis 38 is shown as a U-shaped clevis which two ends 40. Each end 40 of the clevis 38 includes a bolt hole 42. The clevis 38 is attached to the ratchet strap 30 by looping an end of the ratchet strap 30 about the U-shape clevis and sewing the end of the ratchet strap 30 to the ratchet strap 30, as shown in FIG. 3–6.

The generator 20 includes attachment points 44 along the sides of the generator 20 for each tightening device 26 and which align between the bolt holes 42 of the clevis 38. The attachment points 44 include a bolt hole 46 to receive a bolt 48, as shown in FIG. 6. The bolt 48 is used to attach the clevis 38 to the attachment point 44 by placing the bolt 48 through one of the bolt hotes 42 of the clevis 38, through the bolt hole 46 of the attachment point 44 and finally through the other bolt hole 42 of the clevis 38. A nut 50 is used to secure the bolt 48 in the bolt holes 42, 46. The bolts 48 can be replaced by a pin. The pin should have some locking means to retain the pin in the bolt holes 42, 46. The ratchet mechanism, 34 is used to tighten the ratchet strap 30 when the clevis 38 is attached to the generator 20 and the generator 20 is to be secured to the trailer 10. The ratchet mechanism 34 is used to loosen the ratchet strap 30 when the clevis 38 is attached to the generator 20 and the generator 20 is to be unsecured from the trailer 10. The tightening and loosening of the ratchet strap 30 is performed based on the particular style of ratchet mechanism 34 employed. The end of the ratchet strap 30 attached to the ratchet mechanism 34 can be easily removed from the ratchet mechanism 34 without the use of tools, thereby making it easy to unsecure the generator 20 from the trailer 10. Also, if pins are used instead of bolts 48, the clevis 38 can be quickly released from the attachment point 44 of the generator 20.

Figure 9:
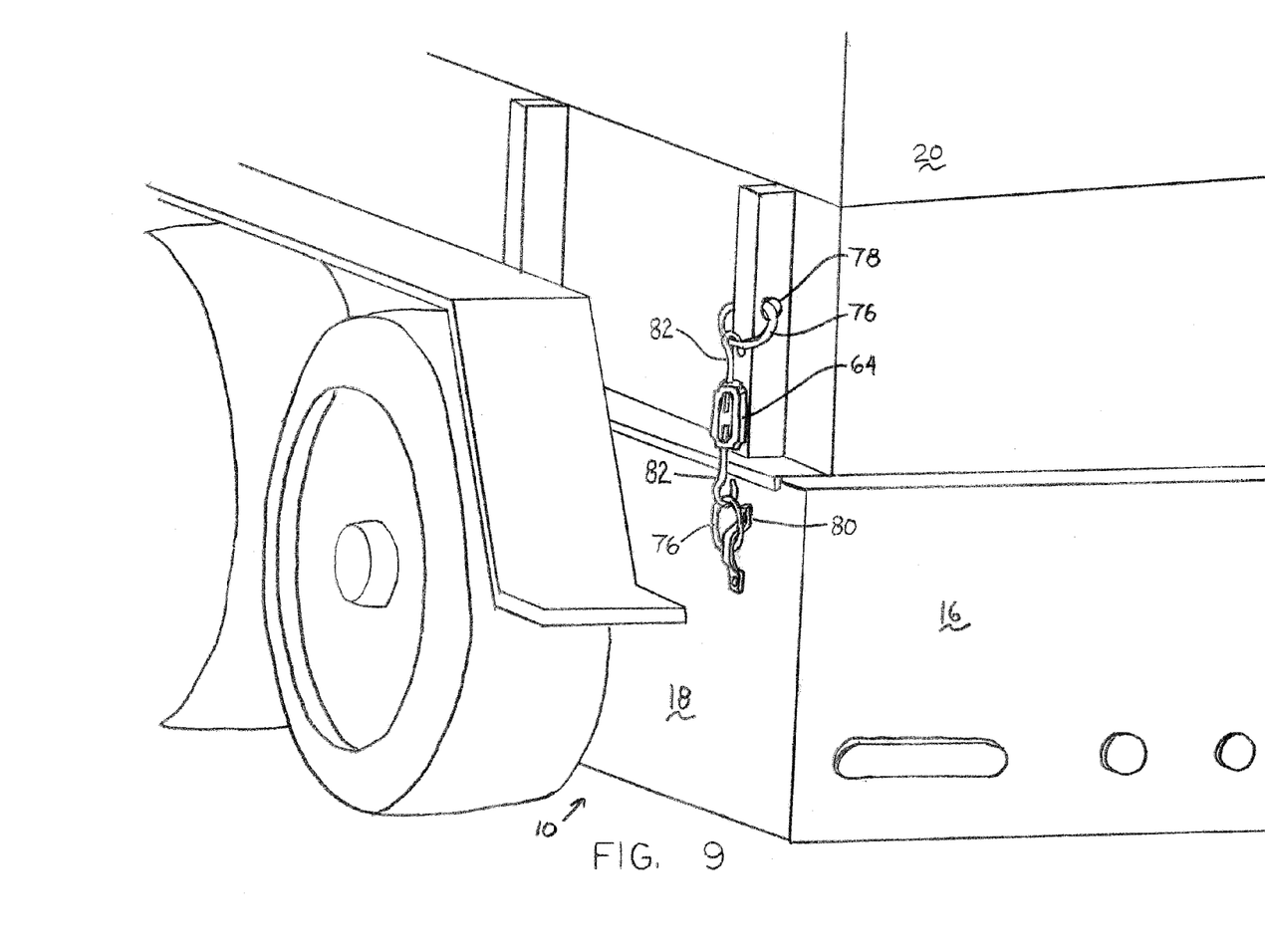
FIG. 9 is a perspective view of a trailer with an anchor system according to the present invention.

The second version of the tightening device 26 shown in FIGS. 7–8 and includes a turnbuckle 52 and two attachment hooks 54. Each attachment hook 54 includes a hook 56 extending from an attachment plate 58. Each attachment plate 58 is shown with two bolt holes 60 and two bolts 62. One attachment hook 54 is bolted to the trailer 10, while the other attachment hook 54 is bolted to the generator 20 in an aligned manner. The attachment hooks 54 could also be secured by welding them to the trailer 10 and the generator 20. The attachment hook 54 on the generator 20 acts as the attachment point 44. The turnbuckle 52 includes a turnbuckle body 64 and two threaded eyes 66. The threaded eyes 66 each have an eye 68 with a threaded shaft 70 extending from the eye 68. The threaded shafts thread in and out of ends 72 of the turnbuckle body 64. Each threaded eye 66 screws into one of the ends 72 of the turnbuckle body 64, which is typical of a turnbuckle 52. To secure the generator 20 to the trailer 10 the eyes 68 of the turnbuckle 52 are placed over the aligned hooks 56 attached to the trailer 10 and the generator 20, as shown in FIG. 8. The turnbuckle body 64 is then turned to pull the eyes 68 toward the turnbuckle body 64 and hence tighten down the generator 20 to the trailer 10. To unsecure the generator 20 from the trailer 10, simply turn the turnbuckle body 64 such that the eyes 68 move away from the turnbuckle body 64. FIG. 9 is a slightly different version of tightening device of FIGS. 7–8. FIG. 9 shows a ring 76 attached through a hole 78 in the structure of the generator 20. FIG. 9 shows a ring 76 attached to a ring holder 80, where the ring holder 80 is attached to the side 18 of the trailer 10. FIG. 9 shows the turnbuckle body 64 with two threaded hooks 82. Whereby, the hooks 82 engage the rings 76.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

What is claimed is:

1. A generator trailer with anchor system adapted for transporting a large generator, comprising:
   a trailer having a bed, said trailer including a front, rear and two sides surrounding said bed; and
   at least four tightening devices, said each of said tightening devices including a trailer component, an adjustable tension component and a generator component, said trailer component attached to said trailer, said generator component adapted to be attached to the generator, said adjustable tension component attached between said trailer component and said generator component to provide tension to secure the generator to said trailer and provides a quick disconnect from the generator;
   wherein said trailer component is a ratchet; wherein said ratchet includes a ratchet mechanism and a ratchet body attached to said trailer to hold said ratchet mechanism; and wherein said tension component is a ratchet strap; and
   wherein said generator component is an attachment point with a bolt hole and wherein said tension component includes a clevis to attach around said attachment point said clevis including two ends which attach around said attachment point, each of said ends of said clevis including a bolt hole which aligns with said bolt hole of said attachment point.

2. A generator trailer with anchor system adapted for transporting a large generator, comprising:
   a trailer having a bed, said frailer including a front, rear and two sides surrounding said bed; and
   at least four tightening devices, said each of said tightening devices including a trailer component, an adjustable tension component and a generator component, said trailer component attached to said trailer, said generator component adapted to be attached to the generator, said adjustable tension component attached between said trailer component and said generator component to provide tension to secure the generator to said trailer and provides a quick disconnect from the generator; walls extending upward above said bed from said front, rear and sides of said trailer, said walls adapted to provide an enclosure for a base of the generator to aid in securing the generator;
   wherein said trailer component is a ratchet; wherein said ratchet includes a ratchet mechanism and a ratchet body attached to said trailer to hold said ratchet mechanism; and wherein said tension component is a ratchet strap;
   wherein said generator component is an attachment point with a bolt hole and wherein said tension component includes a clevis to attach around said attachment point, said clevis including two ends which attach around said attachment point, each of said ends of said clevis including a bolt hole which aligns with said bolt hole of said attachment point.

3. The generator trailer with anchor system of claim 1, further including a bolt to secure said clevis to said attachment point using said bolt holes of said clevis and said attachment point and further including a nut to thread on said bolt to secure said bolt.

4. The generator trailer with anchor system of claim 2, further including a bolt to secure said clevis to said attachment point using said bolt holes of said clevis and said attachment point and further including a nut to thread on said bolt to secure said bolt.

5. The generator trailer with anchor system of claim 1, further including a pin to secure said clevis to said attachment point using said bolt holes of said clevis and said attachment point and further including a locking means to secure said pin.

6. The generator trailer with anchor system of claim 2, further including a pin to secure said clevis to said attachment point using said bolt holes of said clevis and said attachment point and further including a locking means to secure said pin.

* * * * *